United States Patent
Schauble et al.

(10) Patent No.: US 10,116,338 B2
(45) Date of Patent: Oct. 30, 2018

(54) MEASURING TRANSDUCER SUPPLY UNIT, SYSTEM FOR USE IN AUTOMATION TECHNOLOGY, AND METHOD FOR OPERATING SUCH A SYSTEM

(71) Applicant: Endress + Hauser Wetzer GmbH + Co. KG, Nesselwang (DE)

(72) Inventors: Harald Schauble, Lorrach (DE); Thorsten Springmann, Hausen (DE); Amend Zenuni, Lorrach (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 268 days.

(21) Appl. No.: 14/782,800

(22) PCT Filed: Feb. 17, 2014

(86) PCT No.: PCT/EP2014/052992
§ 371 (c)(1),
(2) Date: Oct. 7, 2015

(87) PCT Pub. No.: WO2014/166656
PCT Pub. Date: Oct. 16, 2014

(65) Prior Publication Data
US 2016/0043746 A1    Feb. 11, 2016

(30) Foreign Application Priority Data

Apr. 8, 2013   (DE) .................. 10 2013 103 454

(51) Int. Cl.
G05B 9/02    (2006.01)
H04B 1/00    (2006.01)
(Continued)

(52) U.S. Cl.
CPC ........... *H04B 1/006* (2013.01); *G05B 19/042* (2013.01); *H04B 5/0031* (2013.01); *H04L 69/08* (2013.01);
(Continued)

(58) Field of Classification Search
CPC ........... H04W 4/00; G05B 2219/33192; G05B 2219/25188
See application file for complete search history.

(56) References Cited

U.S. PATENT DOCUMENTS 6,133,822 A    10/2000   Pfandler
7,010,294 B1    3/2006   Pyotsia
(Continued)

FOREIGN PATENT DOCUMENTS

CN    101669153 A    3/2010
CN    101821686 A    9/2010
(Continued)

OTHER PUBLICATIONS

International Search Report, EPO, The Netherlands, dated May 28, 2014.
(Continued)

*Primary Examiner* — Cindy Trandai
(74) *Attorney, Agent, or Firm* — Bacon & Thomas, PLLC

(57) ABSTRACT

A measuring transducer supply unit for use in automation technology, which makes the connection of at least one field unit to a superordinate unit by means of a two-wire line possible, wherein the measuring transducer supply unit comprises at least a switch, a radio module, and a circuitry. The radio module can be activated or de-activated by means of the switch, and the circuitry realizes the conversion between signals of the two-wire line and signals of the radio module such that the at least one field unit connected to the measuring transducer supply unit via the two-wire line can
(Continued)

be operated by wireless communications connection by means of the radio module.

8 Claims, 1 Drawing Sheet

(51) Int. Cl.
*H04W 76/20* (2018.01)
*G05B 19/042* (2006.01)
*H04B 5/00* (2006.01)
*H04L 29/06* (2006.01)

(52) U.S. Cl.
CPC ... *H04W 76/20* (2018.02); *G05B 2219/25187* (2013.01); *G05B 2219/25428* (2013.01); *G05B 2219/33192* (2013.01)

(56) References Cited

U.S. PATENT DOCUMENTS

| | | | |
|---|---|---|---|
| 8,310,088 B2 | 11/2012 | Kah | |
| 8,725,081 B2 | 5/2014 | Kantzes | |
| 2005/0265269 A1 | 12/2005 | Saito | |
| 2006/0116102 A1* | 6/2006 | Brown | G05B 19/4185 455/343.1 |
| 2008/0126665 A1* | 5/2008 | Burr | G05B 19/042 710/316 |
| 2008/0211664 A1 | 9/2008 | Griech | |
| 2008/0274766 A1* | 11/2008 | Pratt | G01D 21/00 455/552.1 |
| 2008/0280568 A1* | 11/2008 | Kielb | G01D 21/00 455/74.1 |
| 2009/0146502 A1 | 6/2009 | Sinreich | |
| 2010/0026518 A1 | 2/2010 | Kirst | |
| 2010/0201342 A1 | 8/2010 | Thoren | |
| 2011/0037478 A1* | 2/2011 | Ohya | G05B 9/02 324/500 |
| 2011/0043183 A1* | 2/2011 | Sawada | G05B 9/02 323/304 |
| 2012/0179423 A1 | 7/2012 | Robl | |
| 2014/0070609 A1 | 3/2014 | Fiedler | |
| 2014/0103897 A1* | 4/2014 | Wang | H02M 1/38 323/311 |

FOREIGN PATENT DOCUMENTS

| | | |
|---|---|---|
| DE | 10248152 B4 | 6/2004 |
| DE | 102004020393 A1 | 11/2005 |
| DE | 102005027047 A1 | 12/2006 |
| DE | 102005041862 A1 | 3/2007 |
| DE | 102006009979 A1 | 9/2007 |
| DE | 102006054421 A1 | 5/2008 |
| DE | 102007054923 A1 | 5/2009 |
| DE | 102008029956 A1 | 12/2009 |
| DE | 102009029495 A1 | 3/2011 |
| DE | 102008062815 B4 | 7/2011 |
| DE | 102010063226 A1 | 6/2012 |
| DE | 102011076708 A1 | 12/2012 |
| EP | 0927982 A1 | 7/1999 |
| EP | 1045302 A1 | 10/2000 |
| EP | 2092397 B1 | 8/2009 |
| WO | 2007025879 A1 | 3/2007 |
| WO | 2008061935 A1 | 5/2008 |
| WO | 2008127580 A2 | 10/2008 |
| WO | 2010094301 A1 | 8/2010 |

OTHER PUBLICATIONS

English Translation of the International Preliminary Report on Patentability, WIPO, Geneva, CH, dated Feb. 17, 2014.

* cited by examiner

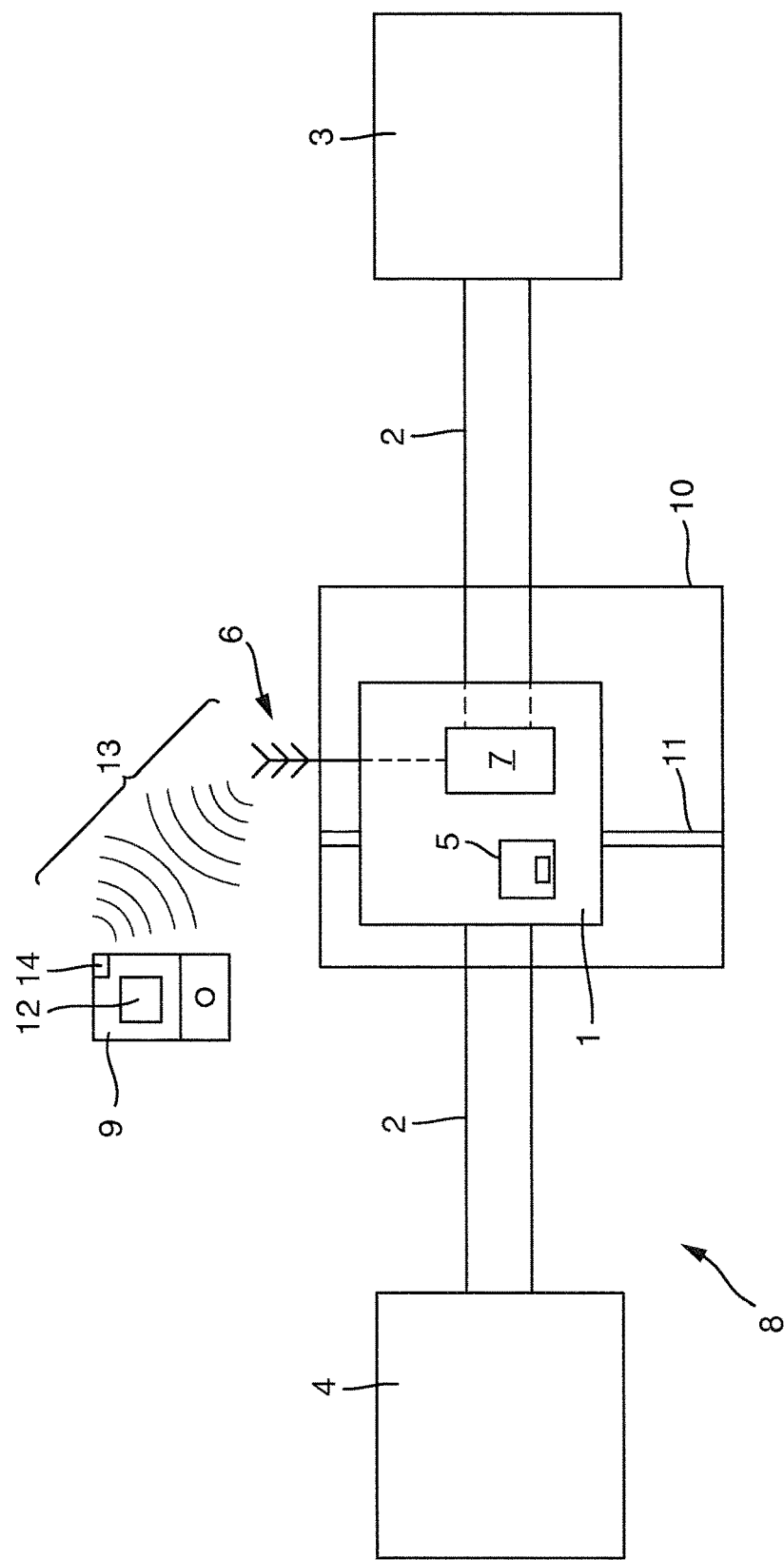

MEASURING TRANSDUCER SUPPLY UNIT, SYSTEM FOR USE IN AUTOMATION TECHNOLOGY, AND METHOD FOR OPERATING SUCH A SYSTEM

TECHNICAL FIELD

The invention relates to a measuring transducer supply unit, a system for use in automation technology, and a method for operating such a system.

BACKGROUND DISCUSSION

Multiple field units, which are used to record and/or control process variables, are utilized in process automation engineering. Examples of field units of this type are level measurement devices, mass flow meters, pressure and temperature measurement devices, pH and redox potential meters, conductivity meters etc., which, as sensors, record the corresponding process variables such as fill level, flow rate, pressure, temperature, pH value and conductivity value.

To influence process variables, so-called actuators are utilized, e. g. valves that control the flow rate of a liquid in a pipeline section, or pumps that change the fill level in a container.

A variety of such field units are manufactured and marketed by the company Endress+Hauser®.

Such field units are often connected to superordinate units, e. g. control systems or control units. These superordinate units are utilized for process control, process visualization or process monitoring.

The energy and/or signal transmission between field units and superordinate units frequently takes place according to the known 4 to 20 mA standard, where a 4 to 20 mA current loop or two-wire line runs between the field unit and the superordinate unit.

The HART protocol is based on this 4 to 20 mA standard. With the aid of the HART protocol and the thus enabled bidirectional communication, the aforementioned field units can be very flexibly parameterized and put into operation, and data records stored on the device can be easily retrieved.

Consequently, the HART protocol enables a very simple operation of the field unit through a control unit.

To this end, the data to be transmitted are modulated onto the 4 to 20 mA signal or the 4 to 20 mA current loop to ensure digital communication between the field unit and the control unit, with the analog signal transmission taking place simultaneously.

If, for example, the field units are sensors, the measured values recorded by the sensors are transmitted in the form of an analog current signal to the superordinate unit via the two-wire line. The measuring range of the sensors is represented linearly on the 4 to 20 mA current signal. At the same time, a two-way communication is available through the digital HART communication, for example to carry out a parameterization of the field unit using the control unit. In addition to the HART protocol, there are other protocols such as Foundation Fieldbus and/or Profibus PA that provide functions similar to those of HART.

The energy supply to the field units likewise occurs through the 4 to 20 mA current signal so that no other supply line is needed in addition to the two-wire line. Normally, the energy supply is not realized through the superordinate unit, but through a measuring transducer supply unit that is connected to the 4 to 20 mA current loop or two-wire line and typically arranged separately from the superordinate unit.

For the use of field units in explosion-hazardous areas, specific measures regarding intrinsic safety are necessary. Thus, a galvanic isolation is needed for the transmission of signals between the superordinate unit, which is located in the safety zone, and the field unit, which is located in the intrinsically safe zone.

From state of the art technology, control units are known that are physically connected to the 4 to 20 mA current loop for communication with the field unit, thus enabling the field unit to be controlled by means of the HART protocol through the 4 to 20 mA current loop. Such control units have the disadvantage, as stated above, that they need to be physically connected or tapped to the 4 to 20 mA current loop. To that end, the two-wire line has to be modified, e. g. stripped and/or cut, to enable a connection to the control unit. As a result, the actual analog current signal that transmits the measured values of the field unit is not transmitted during the connection process of the control unit. In other words, the analog transmission of the measured values is interrupted.

It is also known from state-of-the-art technology that radio modules are utilized to facilitate the operation of field units. Solutions are known, where field units have integrated radio modules. However, it has also become known that field units have been retrofitted with radio modules, so that the field units then can be operated by utilizing control units that are likewise equipped with a radio unit.

Such solutions have the disadvantage that the radio module requires an energy supply in addition to the field unit. The energy supply to the field units and to the radio module is achieved, as mentioned above, through the 4 to 20 mA current loop. The supply of electrical energy to the 4 to 20 mA current loop takes place e.g. through a measuring transducer supply unit, as described above. This provides the electrical voltage required for the adjustment of a current value in the current loop. Often, the energy that can be supplied to the current loop when using the signal line is not sufficient to provide the field unit with the energy needed for operating the integrated radio module.

A remedy for this disadvantage is found, as proposed in German patent, DE 10 2004 020 393 A, in providing a separate energy supply for the radio module in the form of a battery.

However, the disadvantage of this solution lies in the fact that the maintenance, especially monitoring the battery status, requires a substantial effort from the operator of such a field unit.

Moreover, an additional disadvantage of such solutions is found in the fact that field units fitted with radio modules are not permanently controllable, which means that inadvertent operation or even deliberate manipulation cannot be ruled out or prevented. Thus, for example, it can occur that an operator, who is within reach of the radio module for wireless communication, can inadvertently be connected to the field unit and thus trigger an unintended operation of this field unit. In addition to such unintended operations, deliberate actions can be carried out in the form of manipulation of such field units that are fitted with radio modules. Especially in large automation plants, where the field units are spread out over a wide area, effective control of the field units can be extremely difficult, and it cannot be ruled out that manipulations of field units occur, e. g. in the form of a hacking attack.

SUMMARY OF THE INVENTION

The invention is based on the goal of creating increased ease of operation for a field unit that is being utilized in automation technology.

This goal is achieved by a measuring transducer supply unit, a system for use in automation technology, and a method for operating such a system.

As far as the measuring transducer supply unit is concerned, the goal is achieved according to the invention by utilizing a measuring transducer supply unit for use in automation technology that enables the connection of at least one field unit to a superordinate unit via a two-wire line, whereby the measuring transducer supply unit comprises at least one switch, one radio module and one circuit, where the radio unit can be activated and de-activated by the switch and the circuit realizes the conversion of signals from the two-wire line and signals from the radio unit, so that at least one field unit that is connected to the measuring transducer supply unit via a two-wire line can be operated by means of a radio module using a wireless communications connection.

According to the invention, a radio module is integrated into a measuring transducer supply unit that enables the connection of at least one field unit to a superordinate unit. The radio module can be activated and deactivated by a switch, thus enabling a control unit to communicate with the field unit through the measuring transducer supply unit by means of a wireless connection. Communication between the at least one field unit and the control unit takes place preferably by means of the HART protocol described above. However, Foundation Fieldbus and/or Profibus PA could also be considered.

Through the integration of the radio module into the measuring transducer supply unit, a number of advantages are realized.

Thus, the integration of a radio module into a measuring transducer supply unit for operating a field unit makes connecting and disconnecting of the control unit to and from the two-wire line unnecessary. Accordingly, a continuous communication between the field unit and the superordinate unit is possible even while communication between the control unit and the field unit is taking place.

A further advantage lies in the fact that the radio module no longer needs to be supplied with energy via the 4 to 20 mA two-wire line, as it is supplied with energy directly through the measuring transducer supply unit. This reduces the maintenance effort, as control and monitoring of the proper energy supply, e. g. the battery status, of the radio module is no longer required.

In addition to that, access to the field unit can more easily be controlled by means of the switch that activates and de-activates the radio module. Firstly, a deliberate activation of the radio module of a specific field unit by the operator is thus required, and secondly, the radio module is no longer continuously active, which significantly shortens the time periods during which manipulation can occur.

A further advantage results from the fact that operation of a field unit that is located, for example, on a tank and is not easily accessible, can now be more easily performed, as operation of the field unit is enabled through the measuring transducer supply unit, which is typically located in easily accessible areas of the automation plant.

According to a favorable arrangement, a galvanic isolation between field unit and the superordinate unit is realized within the measuring transducer supply unit.

According to a further favorable arrangement, the radio module is designed in such a way that the wireless communications connection is enabled preferably by means of Bluetooth and/or near field communication. However, a radio module is conceivable that enables a wireless communications connection according to e. g. ANT, WirelessHART, ZigBee or nanoNET.

As far as the system is concerned, the goal is achieved according to the invention through a system for use in automation technology that comprises at least the following:
- a measuring transducer supply unit according to at least one of the aforementioned arrangements,
- a superordinate unit that is connected by the measuring transducer supply unit to a field unit via a two-wire line, and
- a mobile terminal that has a unit that corresponds to the radio module for the wireless communications connection.

A mobile terminal can be a device such as a Smartphone, mobile phone, Laptop, Tablet-PC, PDA, Netbook, UMPC, etc.

According to a favorable arrangement, a control cabinet is provided, wherein the measuring transducer supply unit is fastened. Particularly, the measuring transducer supply unit is fixed within the control cabinet by means of a top hat rail.

According to a further favorable arrangement, an operator software runs on the mobile terminal that enables the operation of the field unit.

As far as the method is concerned, the goal is achieved by a method for operating a system as it is described in one of the aforementioned arrangements, whereby the method encompasses the following steps:
- actuating the switch on the measuring transducer supply unit, thus activating the radio module,
- establishing a wireless communications connection between the radio module of the measuring transducer supply unit and the corresponding unit of the mobile terminal, and
- operating the field unit connected to the measuring transducer supply unit by means of the wireless communications connection between the measuring transducer supply unit and the mobile terminal,
- actuating the switch on the measuring transducer supply unit, thus deactivating the radio module.

BRIEF DESCRIPTION OF THE DRAWING

The invention is further illustrated referring to the following drawings. Illustrated are:

FIG. 1: is a system for use in automation technology that comprises a measuring transducer supply unit according to the invention.

DETAILED DISCUSSION IN CONJUNCTION WITH THE DRAWING

FIG. 1 shows a system 8 for use in automation technology that comprises a measuring transducer supply unit 1, a field unit 3 as well as a superordinate unit 4. The field unit 3 is connected via a two-wire line 2 to the superordinate unit 4, in order to transmit measured values and/or actuating values in case of an actuator between the field unit 3 and the superordinate unit 4.

The superordinate unit 4 can be e. g. a control system or a control unit that is utilized to control, visualize or monitor the process. Typically, the superordinate unit 4 is arranged in a control room separate from the field unit 3. From this superordinate unit 4, the two-wire line 2 runs via the measuring transducer supply unit 1 that is mounted on a top hat rail 11 in the control cabinet 10 to the field unit 3. Such measuring transducer supply units 1 in automated plants are frequently centrally combined in a control cabinet 10.

According to the invention, the measuring transducer supply unit 1 encompasses a switch 5, enabling the activation and de-activation of an integrated radio module 6 as well as a circuit 7 that realizes the conversion between the signals of the two-wire line 2 according to the HART protocol and the signals of the radio module 6. Thus, the field unit 3 that is connected to the measuring transducer supply unit 1 can be operated by means of the radio module 6 using a wireless communications connection 13.

By means of the radio module 6 that is integrated in the measuring transducer supply unit 1, the field unit 3 that is connected to the measuring transducer supply unit 1 can be operated from a mobile terminal 9, which has a unit 14 corresponding to the radio module 6 for the wireless communications connection 13.

The radio module 6 and the corresponding unit 14 on the mobile terminal 9 are designed in such a way that the wireless communications connection 13 is enabled by means of Bluetooth and/or near field communication. However, a design is also conceivable that enables a wireless communications connection 13 according to e. g. ANT, WirelessHART, ZigBee and/or nanoNET.

An operator software 12 runs on the mobile terminal 9 that enables the operation of the field unit 3.

Thus, by completing the following process steps, the field unit 3 can be securely operated by e. g. a service technician using the mobile terminal 9.

In a first step, the switch 5 on the measuring transducer supply unit 1 has to be actuated in such a way that the radio module 6 is activated.

In a second step, the wireless communications connection 13 between the radio module 6 of the measuring transducer supply unit 1 and the corresponding unit 14 on the mobile terminal 9 has to be established by means of the operator software 12.

In a third step, the field unit 3 that is connected to the measuring transducer supply unit 1 can now be operated by means of the communication connection 13 between the mobile terminal 9 and the radio module 6 on the measuring transducer supply unit 1.

In a last step, after completing the operation of the field unit 3, the switch 5 on the measuring transducer supply unit 1 has to be actuated again, in order to deactivate the radio module 6.

The invention claimed is:

1. A measuring transducer supply unit for use in automation technology that enables the connection to at least one field unit via a first two-wire line and to a superordinate unit via a second two-wire line, whereby the measuring transducer supply unit comprises at least:
   one switch;
   one radio module; and
   one circuit, wherein:
   said radio module can be activated and de-activated by said switch;
   said circuit realizes the conversion of signals between signals of two-wire lines and signals of said radio unit, so that the minimum of one field unit that is connected to the measuring transducer supply unit via said first two-wire line can be operated by means of said radio module using a wireless communications connection and by means of the connection between the measuring transducer supply unit and the at least one field unit via said first two-wire line.

2. The measuring transducer supply unit according to claim 1, wherein:
   in the measuring transducer supply unit a galvanic isolation between the field unit and the superordinate unit is realized.

3. The measuring transducer supply unit according to claim 1, wherein:
   said radio module is designed in such a way that said wireless communications connection is enabled via Bluetooth and/or near field communication.

4. A system for use in automation technology, that comprises at least the following:
   a superordinate unit;
   at least one field unit;
   a measuring transducer supply unit for use in automation technology;
   a first two-wire line, which connects said measuring transducer supply unit with said at least one filed unit;
   a second two-wire line, which connects said measuring transducer supply unit with said superordinate unit;
   a superordinate unit that is connected through said measuring transducer supply unit to a field unit via a two-wire line; and
   a mobile terminal having a unit that corresponds to said radio module for said wireless communications connection, wherein:
   said measuring transducer supply unit comprises at least: one switch; one radio module; and one circuit;
   said radio module can be activated and de-activated by said switch; said circuit realizes the conversion of signals between signals of two-wire lines and signals of said radio unit, so that the minimum of one field unit that is connected to the measuring transducer supply unit via said first two-wire line can be operated by means of said radio module using a wireless communications connection; and
   so that said at least one field unit can be operated via said mobile terminal by means of said wireless communications connection between said measuring transducer supply unit and said mobile terminal by means of the connection between said measuring transducer supply unit and said at least one field unit via said first two-wire line.

5. The system according to claim 4, further comprising:
   a control cabinet, wherein:
   the measuring transducer supply unit is mounted.

6. The system according to claim 5, wherein:
   the measuring transducer supply unit is fixed by means of a top hat rail in said control cabinet.

7. The system according to claim 4, wherein:
   said mobile terminal runs an operator software that enables the operation of a field unit.

8. A method for operating a system for use in automation technology, that comprises at least the following:
   a superordinate unit;
   at least one field unit:
   a measuring transducer supply unit for use in automation technology:
   a first two-wire line, which connects said measuring transducer supply unit with said at least one filed unit;
   a second two-wire line, which connects said measuring transducer supply unit with said superordinate unit: and
   a mobile terminal, wherein: said measuring transducer supply unit comprises: at least one switch; one radio module; and one circuit, said radio module can be activated and de-activated by said switch; said circuit realizes the conversion of signals between signals of two-wire lines and signals of said radio unit, so that the minimum of one field unit that is connected to the measuring transducer supply unit via said first two-wire line can be operated by means of said radio module using a wireless communications connection;

mobile terminal having a unit that corresponds to said radio module for said wireless communications connection, the method comprises the following steps:

actuating said switch on the measuring transducer supply unit, thus activating said radio module;

establishing a wireless communications connection between said radio module of the measuring transducer supply unit and the corresponding unit of the mobile terminal;

operating the at least one field unit via said mobile terminal by means of said wireless communications connection between the measuring transducer supply unit and said mobile terminal and by means of the connection between the measuring transducer supply unit and the at least on field unit via the first two-wire line; and actuating said switch on the measuring transducer supply unit, thus de-activating said radio module.

* * * * *